United States Patent [19]

Harmuth

[11] Patent Number: 4,907,001
[45] Date of Patent: Mar. 6, 1990

[54] EXTRACTION OF RADAR TARGETS FROM CLUTTER

[75] Inventor: Henning F. Harmuth, Potomac, Md.

[73] Assignee: Geophysical Survey Systems, Inc., Hudson, N.H.

[21] Appl. No.: 316,585

[22] Filed: Feb. 27, 1989

Related U.S. Application Data

[63] Continuation of Ser. No. 87,817, Aug. 21, 1987, abandoned.

[51] Int. Cl.⁴ ............................................. G01S 7/28
[52] U.S. Cl. ........................................ 342/159; 342/21; 342/63; 342/160; 342/189
[58] Field of Search ................... 342/21, 28, 63, 64, 342/189, 192, 193, 196, 159, 160, 195

[56] References Cited

U.S. PATENT DOCUMENTS

| 3,478,354 | 11/1969 | Foster et al. | 342/21 |
|---|---|---|---|
| 3,879,728 | 4/1875 | Wolff | 342/64 |
| 3,974,328 | 8/1976 | Thomas et al. | 342/64 X |
| 4,062,010 | 12/1977 | Young et al. | 342/21 |
| 4,084,148 | 4/1978 | Koshikawa | 342/192 X |
| 4,103,847 | 8/1978 | Thomas et al. | 244/3.18 |
| 4,117,481 | 9/1978 | Constant | 342/192 X |
| 4,119,968 | 10/1978 | Goldfischer | 342/64 X |
| 4,164,728 | 8/1979 | Marsh | 342/64 X |
| 4,175,285 | 11/1979 | Dansac et al. | 342/64 X |
| 4,179,693 | 12/1979 | Evans et al. | 342/64 |
| 4,346,382 | 8/1982 | Bosc et al. | 342/192 |
| 4,347,511 | 8/1982 | Hofmann et al. | 342/64 |
| 4,348,674 | 9/1982 | Muth et al. | 342/192 |
| 4,389,647 | 6/1983 | Fanuele et al. | 342/192 |
| 4,396,903 | 8/1983 | Habicht et al. | 342/64 X |
| 4,415,898 | 11/1983 | Gaunaurd et al. | 342/192 |
| 4,483,017 | 11/1984 | Hampel et al. | 342/192 X |
| 4,484,193 | 11/1984 | Bellew | 342/192 X |
| 4,490,718 | 12/1984 | Opitz et al. | 342/192 |
| 4,490,719 | 12/1984 | Botwin et al. | 342/64 X |
| 4,495,580 | 1/1985 | Keearns | 342/64 X |
| 4,514,733 | 4/1985 | Schmidtlein et al. | 342/64 |
| 4,584,646 | 4/1986 | Chan et al. | 342/64 X |
| 4,602,336 | 7/1986 | Brown | 342/64 X |
| 4,603,331 | 7/1986 | Wehner | 342/192 |
| 4,635,058 | 1/1987 | Sutphin, Jr. | 342/192 X |
| 4,641,137 | 2/1987 | Opitz et al. | 342/192 |
| 4,641,138 | 2/1987 | Opitz | 342/192 |
| 4,673,940 | 6/1987 | Barley et al. | 342/192 |
| 4,675,677 | 6/1987 | von Maydell et al. | 342/189 X |
| 4,698,635 | 10/1987 | Hilton et al. | 342/64 |
| 4,700,307 | 10/1987 | Mons et al. | 342/64 X |
| 4,715,005 | 12/1987 | Heartz | 342/64 X |
| 4,803,489 | 2/1989 | Giori | 342/192 |
| 4,829,306 | 5/1989 | Gjessing et al. | 342/189 X |

Primary Examiner—Thomas H. Tarcza
Assistant Examiner—Bernarr Earl Gregory
Attorney, Agent, or Firm—Wolf, Greenfield & Sacks

[57] ABSTRACT

The extraction of radar targets, in particular airplanes or cruise missiles, from clutter is typically based on the target's velocity relative to the ground. Equipment using this principle is usually referred to as a doppler processor or moving target indicator. In situations where severe clutter is encountered, as for example where a look-down radar is trying to find low-flying cruise missiles, extraction of the target solely through its velocity relative to the ground is generally unsatisfactory. A similarly situated human observer looking down can recognize a target both from its motion and the characteristic shape of a fuselage with wings. The principle of this "shape recognition" or "pattern recognition" is here applied to radar by utilizing the so-called radar signature of the target. The conventional small-relative-bandwidth radar which uses signals that are amplitude modulated onto a sinusoidal carrier does not yield enough of a radar signature for this application but the so-called "carrier-free radar" does. Carrier-free radar is also known as "impulse radar", "nonsinusoidal radar", or "large-relative-bandwidth radar".

4 Claims, 10 Drawing Sheets

EXTRACTION OF RADAR TARGETS FROM CLUTTER

This application is a continuation of application Ser. No. 87,817, filed 08/21/87, now abandoned.

FIELD OF THE INVENTION

This invention relates to a method for the extraction of radar targets from clutter by recognizing the target's shape from the radar signature imparted to the returned radar signal. The method may be used either by itself or in conjunction with methods based on the relative velocity between target and the clutter producing background. The method is particularly useful with look-down radars that are trying to find small cruise missiles flying close to the surface of the Earth.

BACKGROUND OF THE INVENTION

Ground based radar is very effective for searching and tracking high flying targets. However, ground based radar is much less effective against very low flying targets because of the short distance to the horizon and because of objects such as trees, buildings, or hills that may mask the low flying targets. Those limitations on detection by radar are effectively exploited by the cruise missile whose precise control enables it to fly closer to the ground or water than a manned aircraft. An ideal solution for the detection of such low-flying objects is to place a radar high above the ground and look down. Airplanes, blimps, and stationary balloons can be used as carriers of such radars. The distance to the horizon then becomes very large and a wide area can be placed under observation.

The primary problem of the look-down radar is the clutter produced by the surface of the Earth. One must find a small target in front of the huge surface of the Earth. The range resolution of the radar can generally not be used to separate the target from the Earth's surface; an exception occurs where the target is almost exactly below the radar. A human observer uses two principles to recognize a target under these conditions:

(a) the velocity of the target relative to the surface of the Earth is recognized;

(b) the shape or pattern of the target is recognized.

It is noteworthy that most animals utilize velocity information better than they do shape information; this is the reason why a dog can recognize a running rabbit much better than a motionless rabbit. We infer from this observation that recognition by the use of velocity requires less signal processing than recognition by the use of the shape.

Radar, at least since 1943, has utilized velocity information to discriminate between moving targets and stationary clutter. The methods developed for such radars are referred to as doppler processing and moving target indication (often abbreviated to "MTI"). These methods of velocity discrimination are of crucial importance because the difficulty in distinguishing a target from the clutter by look-down radar is severe and a pressing need exists for appreciable improvement. Here disclosed is a novel method for recognizing a target by its shape or pattern which can be combined with known methods of velocity discrimination to provide the two principal components needed for recognition of a moving target.

THE DRAWINGS

FIG. 9c and 9d represent the output due to the signals $F_{R1}(t)$ and $F_{R2}(t)$ of FIGS. 2f and 3f with the stairs omitted.

FIGS. 1(a) and 1(b) are drawn on the same time axis as are the following groups of FIGS: 2(b)-2(f); 3(b)-3(f); 4(a) and 4(b); 5(a) and 5(b); 6(a)-6(d); 9(b)-9(c); and 10(b) and 10(c).

DETAILED DESCRIPTION

Figure 1A:
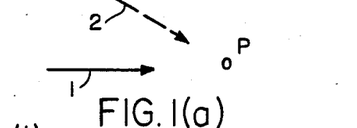
FIG. 1a shows a point scatterer P on which radar signals impinge from the directions 1 or 2.

A single point scatterer, represented by the point P in FIG. 1a, returns a radar signal having the same time variation as the incident radar signal. For instance, if the incident signal—represented by an electric field strength—has the time variation of $F_R(t)$ shown in FIG. 1b, the returned signal will have the same time variation. This time variation is independent of the direction of incidence of the radar signal, represented by the arrows 1 and 2 in FIG. 1a. A radar receiver will pass the returned signal $F_R(t)$ through a sliding correlator set to detect $F_R(t)$. In the absence of noise one obtains the auto-correlation function 4 of FIG. 1c. This auto-correlation function exceeds a threshold voltage at the time $t_0$. The crossing of the threshold is used as a criterion that a return signal from the target was received, and the distance to the target is derived from the time $t_0$.

A radar reflector acts very similarly to a scattering point. The radar reflector returns the signal without change of time variation (except perhaps for an amplitude reversal) regardless of the angle of incidence (except for some singular cases) and changes only the amplitude of the signal. All other targets produce a change of time variation between the incident and the returned signal. This time variation change is usually referred to as the target's "radar signature". The effect is typically small for the conventional radar using a sinusoidal carrier amplitude modulated by a binary pulse sequence. However, the effect is very large for a large-relative-bandwidth radar and consequently that large effect can be used to recognize the shape or pattern of a target. Such a radar is described in U.S. Pat. No. 4,651,153, which was granted on an invention titled "Large Relative Bandwidth Radar". Two books which are basic to an understanding of that kind of radar are "Nonsinusoidal Waves for Radar and Radio Communication" by H. F. Harmuth, Academic Press 1981, and "Antennas and Waveguides for Nonsinusoidal Waves" by H. F. Harmuth, Acedemic Press 1984.

Figure 1B:
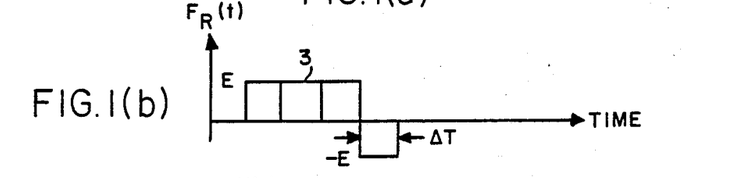
FIG. 1b represents the returned signal $F_R(t)$.
Figures 2A, 2B:
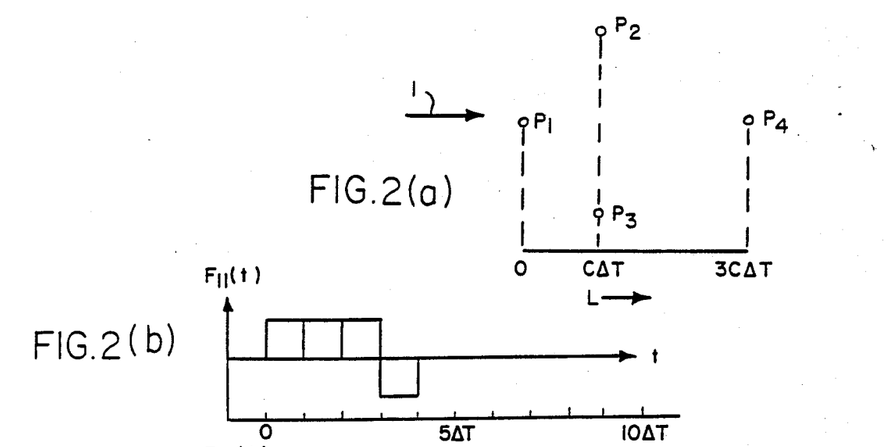
FIG. 2a shows four point scatterers $P_1$ to $P_4$ situated to represent the extremes of the fuselage and the wing-tips of an aircraft.
FIGS. 2b, c, d, and e represent the signals returned from each of the four scattering points when a radar signal from direction 1 is incident on those points.
Figure 2C:
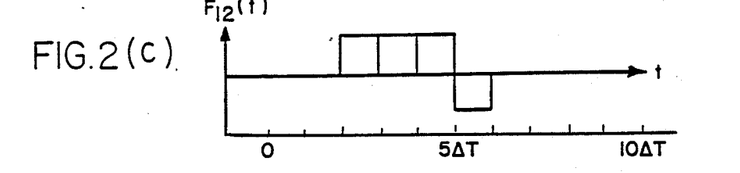
Figure 2D:
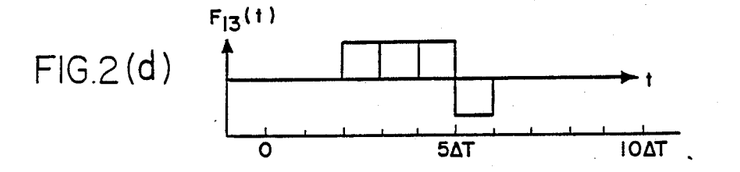
Figure 2E:
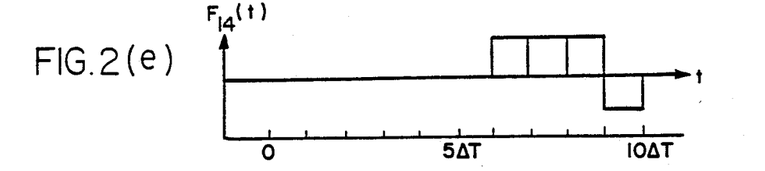

Consider now a target having four scattering points $P_1$, $P_2$, $P_3$, and $P_4$ arranged as shown in FIG. 2a. This arrangement is chosen to represent the front and rear ends of the fuselage and the wing tips of an airplane. Let a radar signal with the time variation of $F_R(t)$ of FIG. 1b impinge on these four scattering points from the direction of arrow 1 in FIG. 2a. The scattering point $P_1$ returns the signal $F_{11}(t)$ of FIG. 2b, the scattering points $P_2$ and $P_3$ return the delayed signals $F_{12}(t)$ and $F_{13}(t)$ shown respectively in FIGS. 2c and 2d, while the scattering point $P_4$ returns the more delayed signal $F_{14}(t)$ shown in FIG. 2e. The radar receives the sum of these four signals, denote $F_{R1}(t)$ in FIG. 2f.

Consider next the four scattering points $P_1$, $P_2$, $P_3$, and $P_4$ whose positions are obtained by rotation of the four scattering points of FIG. 2a. The implication here is that the rotated points represent the same type of aircraft but flying on a different course relative to the incident radar signal whose direction is represented by the arrow 1 in FIG. 3a. We could have chosen four scattering points representing a smaller or larger aircraft or we could have chosen fewer or more than four scattering points. The important thing at the moment is that the scattering points in FIGS. 2a and 2b are differently arranged, and that the radar signature of the targets can be used to discriminate between these two arrangements.

Figures 3A, 3B:
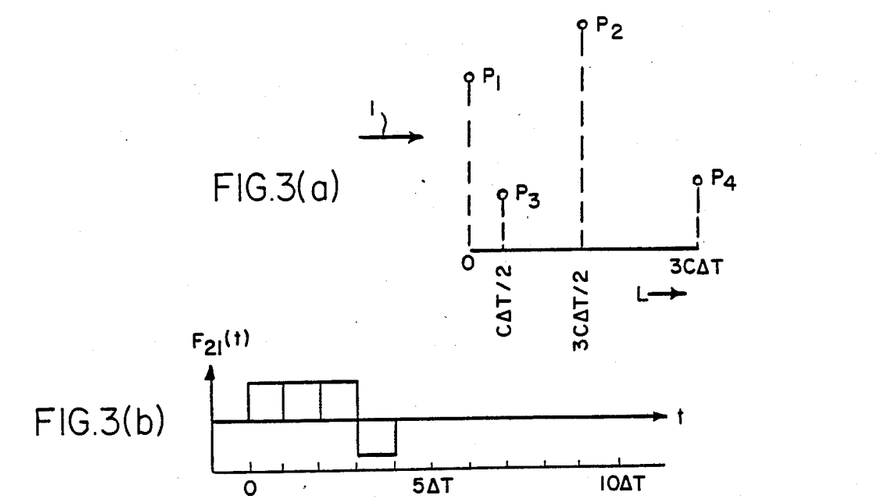
FIG. 3a differs from FIG. 2a only in that the four points $P_1$ to $P_4$ have been rotated relative to the direction of the impinging signal 1.
FIGS. 3b, c, d, and e represent the signals returned from the rotated points when a radar signal from direction 1 is incident of those points.
Figure 3C:
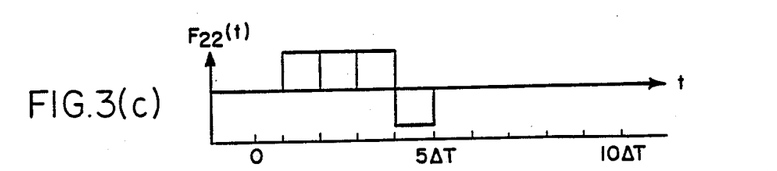
Figure 3D:
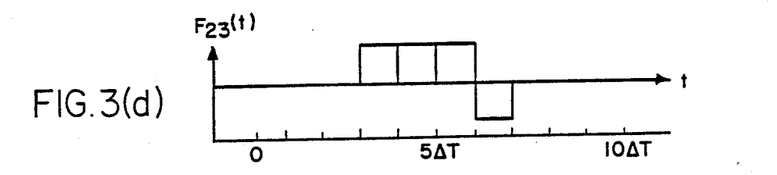
Figure 3E:
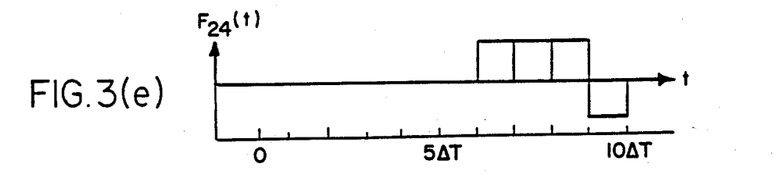

The radar signals returned from the four scattering points in FIG. 3a are denoted $F_{21}(t)$ to $F_{24}(t)$ in FIGS. 3b, 3c, 3d, and 3e. Note that those signals differ only by a shift in time and are otherwise identical. The sum of the four signals, denoted $F_{R2}(t)$ in FIG. 3f, is received by the radar.

Figure 2F:
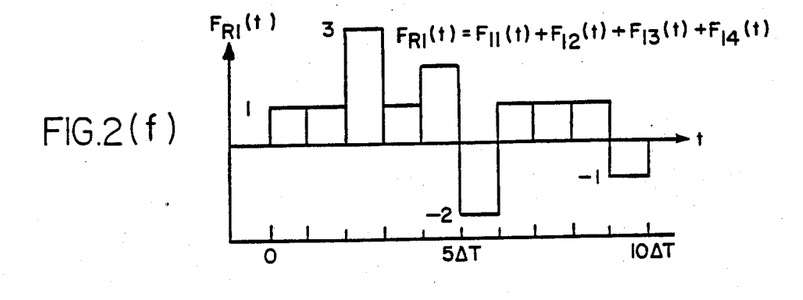
FIG. 2f represent the sum of the FIGS. 2b, c, d, and e return signals.
Figure 3F:
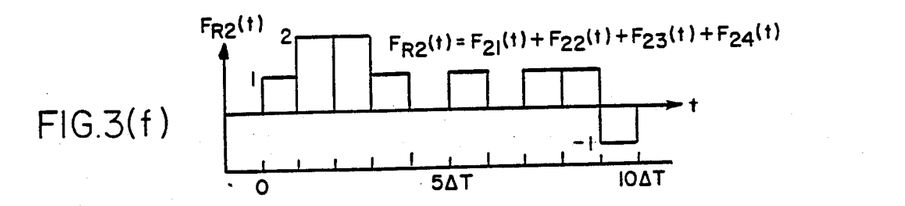
FIG. 3f represents the sum of the FIGS. 2b, c, d, and e return signals.

A comparison of signals $F_{R1}$ in FIG. 2f and $F_{R2}(t)$ in FIG. 3f shows their striking difference. The large-relative-bandwidth radar produces a sufficiently large radar signature to distinguish between the targets of FIGS. 2a and 3a. In principle, we could claim that a radar operator observing the received signal on a cathode ray tube and comparing it with signals received during a training period from various targets could decide which target produced the signal. Practically we want to automate the process. However, we may learn from the human operator that the recognition of shape o pattern requires that reference shapes have been stored previously in a memory, and that shape or pattern recognition requires that one finds in the memory the stored shape or pattern that comes closest to the observed one.

The shape or pattern of the signal $F_{R1}(t)$ and $F_{R2}(t)$ in FIGS. 2f and 3f as functions of time is as characteristic as the shape or pattern of the arrangement of the four scattering points in FIGS. 2a and 3a as functions of space. The signals $F_{R1}(t)$ and $F_{R2}(t)$ are images in the time domain of the patterns of the scattering points in two dimensions of space. The imaging process is quite similar to imaging by photography, which yields an image in two space dimensions of patterns in three space dimensions. It is evident that the reduction of dimensions by any imaging process will occasionally lead to mistakes. For instance, a cylinder in three dimensional space may appear to an observer as a rectangle or a circle if looked at from certain directions. Similar effects will occur if an airplane, which is a pattern in three space dimensions, is represented by a time signal, which is a pattern in one dimension. However, we know from photography that a two-dimensional image is usually good enough to characterize a three-dimensional pattern. The radar signature produces only a one-dimensional image of a three-dimensional pattern and thereby reduces the information more than occurs in photography. However, the possibility of observing the moving target repeatedly, and thus obtaining a different pattern at each observation, is an offsetting factor that in effect increases the number of dimensions of the image from one to two. Although the discussion herein deals only with the recognition of time functions or one-dimensional patterns, it is clear that the extension to two-dimensional patterns is possible and where that extension occurs, as much information as is conveyed by a still photograph can be obtained to make decisions.

Assume that the two time functions $F_{R1}(t)$ and $F_{R2}(t)$ of FIGS. 2f and 3f have been previously obtained and are stored in a memory or library of patterns. Generally, hundreds or thousands of patterns are stored in the library but the principle can be made clear with just two patterns. We denote a received function by $F_{Rj}(t)$ and the sample functions stored in the library by $F_{Si}(t)$, where $i = 1, 2, \ldots$ Let the functions $F_{Si}(t)$ start at $t=0$ and end at $t=T$; a function may be zero during part of this time interval. The integral $$T^{-1} \int_0^T [F_{Rj}(t) - F_{Si}(t)]^2 dt = G(j,i) \tag{1}$$

measures the mean-square-deviation of $F_{Si}(t)$ from $F_{Rj}(t)$. The smallest number $G(j,i)$ will identify the sample function $F_{Si}(t)$ that differs the least from the received function $F_{Rj}(t)$ in the sense of the least-mean-square deviation. We shall use this criterion to decide which sample function $F_{Si}(t)$ comes closest to the received function $F_{Rj}(t)$. If $F_{Rj}(t)$ and $F_{Si}(t)$ are exactly equal we get $G(i,i) = 0$.

We rewrite the integral of Eq.(1):

$$G(j,i) = \tag{2}$$

$$T^{-1}\left[\int_0^T F_{Rj}^2(t)dt - 2\int_0^T F_{Rj}(t)F_{Si}(t)dt + \int_0^T F_{Si}^2(t)dt\right]$$

The first integral is proportional to the energy of the received signal. It is the same for any sample function $F_{Si}(t)$. It may be left out if we are interested only in finding which sample function $F_{Si}(t)$ yields the smallest number $G(j,i)$ without caring what this number is. We may also multiply by $-1$ and consider the following function $H(j,i)$ instead of $G(j,i)$:

$$H(j,i) = 2T^{-1}\int_0^T F_{Rj}(t)F_{Si}(t)dt - T^{-1}\int_0^T F_{Si}^2(t)dt \quad (3)$$

The sample function $F_{Si}(t)$ most similar to $F_{Rj}(t)$ in the sense of the least-mean-square error will produce the largest value of $H(j,i)$.

The second integral in Eq. (3) is proportional to the energy of the sample function $F_{Si}(t)$. If all the sample functions have the same energy, it may be left out and $H(j,i)$ becomes the correlation coefficient of $F_{Rj}(t)$ and $F_{Si}(t)$ multiplied by 2. A look at $F_{R1}(t)$ and $F_{R2}(t)$ in FIGS. 2 and 3 shows that the energy of these functions (used as sample functions) is not the same, and the second integral in Eq. (3) can thus not be dropped.

The function $H(j,i)$ suffices if we know the time of arrival of $F_{Rj}(t)$ and can thus denote by $t=0$ the time of arrival of the beginning of $F_{Rj}(t)$. This is not possible in radar and consequently we must permit an arbitrary arrival time for $F_{Rj}(t)$. This calls for the following modification of $H(j,i)$.

$$H(j,i,t') = 2T^{-1}\int_0^T F_{Rj}(t-t')F_{Si}(t) - T^{-1}\int_0^T F_{Si}^2(t)dt \quad (4)$$

We must produce time functions $H(j,i,t')$ rather than coefficients $H(j,i)$, and determine which function $H(j,i,t')$ has the largest peak value. The observation of the time when this largest peak value occurs will yield the arrival time of the signal $F_{Rj}(t)$ and thus the distance to the target.

The integral $$T^{-1}\int_0^T F_{Rj}(t-t')F_{Si}(t)dt$$

can be produced by a sliding correlator, which is a known and much used circuit in radar. The integral $$T^{-1}\int_0^T F_{Si}^2(t)dt$$

is a number proportional to the energy of the sample function $F_{Si}(t)$. We get from FIGS. 2f and 3f:

$$T^{-1}\int_0^T F_{R1}^2(t)dt = \quad (5)$$

$$(10\Delta T)^{-1}(1+1+9+1+4+4+1+1+1+1)\Delta T =$$

$$24/10$$

$$T^{-1}\int_0^T F_{R2}^2(t)dt = \quad (6)$$

$$(10\Delta T)^{-1}(1+4+4+1+0+1+0+1+1+1)\Delta T =$$

$$14/10$$

If we insert into the first integral of Eq. (4) the function $F_{R1}(t)$ of FIG. 2f for $F_{Rj}(t)$ and the function $F_{R1}(t)$ or $F_{R2}(t)$ for the sample function $F_{Si}(t)$, we get the two functions plotted in FIG. 4a. Similarly, we get the functions of FIG. 4b if we insert $F_{R2}(t)$ for $F_{Rj}(t)$ and either $F_{R1}(t)$ or $F_{R2}(t)$ for $F_{Si}(t)$.

We still have to subtract 24/10 or 14/10 from the functions of FIG. 4 to get $H(j,i,t')$ of Eq. (4). Furthermore, we observe that the peaks of the two functions represented by the solid lines in FIG. 4 are not equal. This is of no consequence for a theoretical study but it is a drawback for equipment design. To equalize the peaks we make the following definitions:

$H_{peak}(i,i,t')$: peak value of $H(j,i,t')$ for a particular value of i  (7)

$H_{max,peak}(t')$: maximum of all peak values $H_{peak}(i,i,t')$ for any value of i  (8)

From FIG. 4 we see $H_{peak}(1,1,t')=24$, i=1

$H_{peak}(2,2,t')=14$, i=2  (9)

and we get $H_{max,peak}(t')=H_{peak}(1,1,t')=24$  (10)

Instead of plotting $H(j,i,t')$ according to Eq. (4) we plot thus in FIG. 5

$H'(j,i,t')=[H_{peak}(i,i,t')/H_{max,peak}(t')]H(j,i,t')$  (11)

for j=1, 2 and i=1, 2.

Let the signal $F_{R1}(t)$ be received from the target in FIG. 2a. The receiver produces the two functions $H'(1,1,t')$ and $H'(1,2,t')$ of FIG. 5a. Since the peak of $H'(1,1,t')$ is larger, we know the target of FIG. 2 was observed.

Figure 5A:
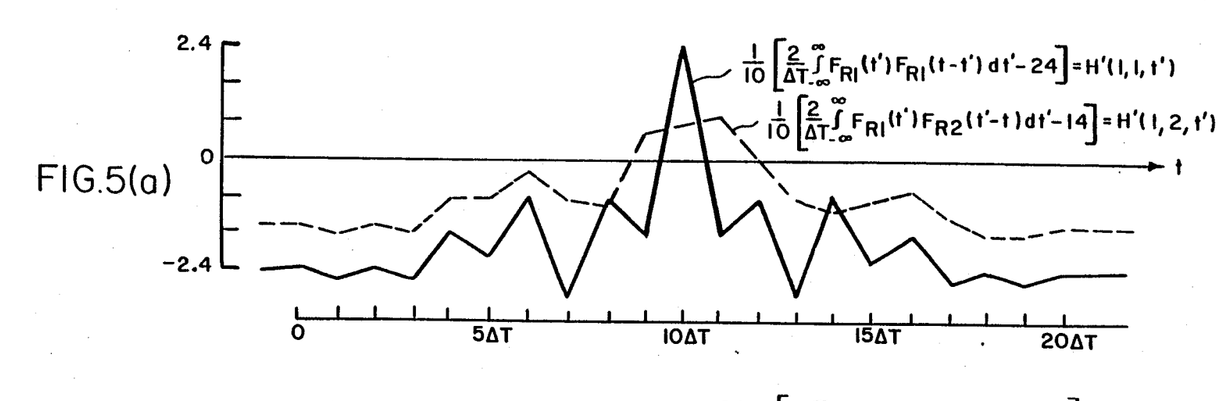
FIGS. 5a and 5b show the functions of FIGS. 4a and 4b corrected for the different energy of the $F_{R1}(t)$ and $F_{R2}(t)$ signals shown in FIGS. 2f and 3f.
Figure 5B:
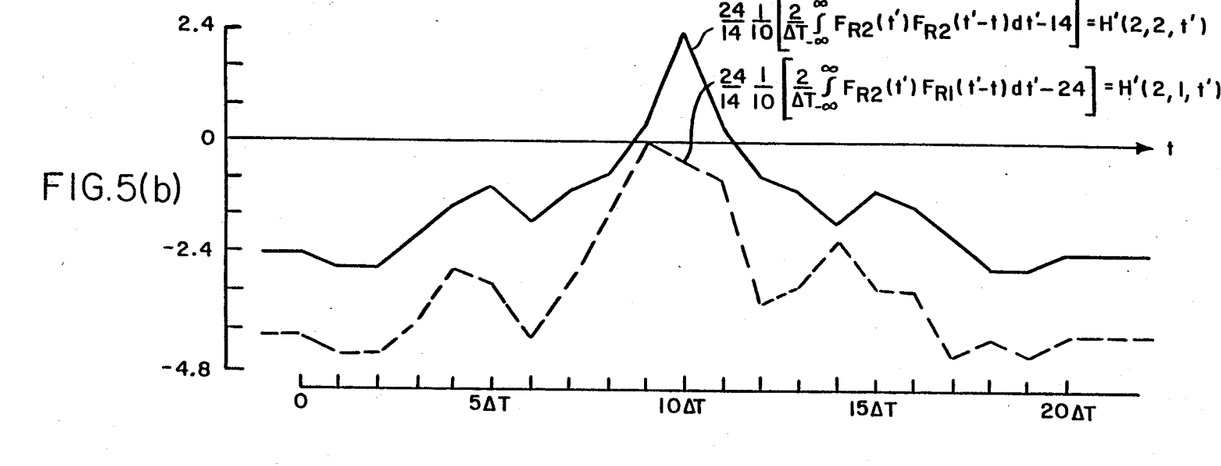

Let now the signal $F_{R2}(t)$ be received from the target in FIG. 3a The receiver produces the two functions $H'(2,2,t')$ and $H'(2,1,t')$ of FIG. 5b. Since the peak of $H'(2,2,t')$ is larger, we know the target of FIG. 3 was observed.

Figure 4A:
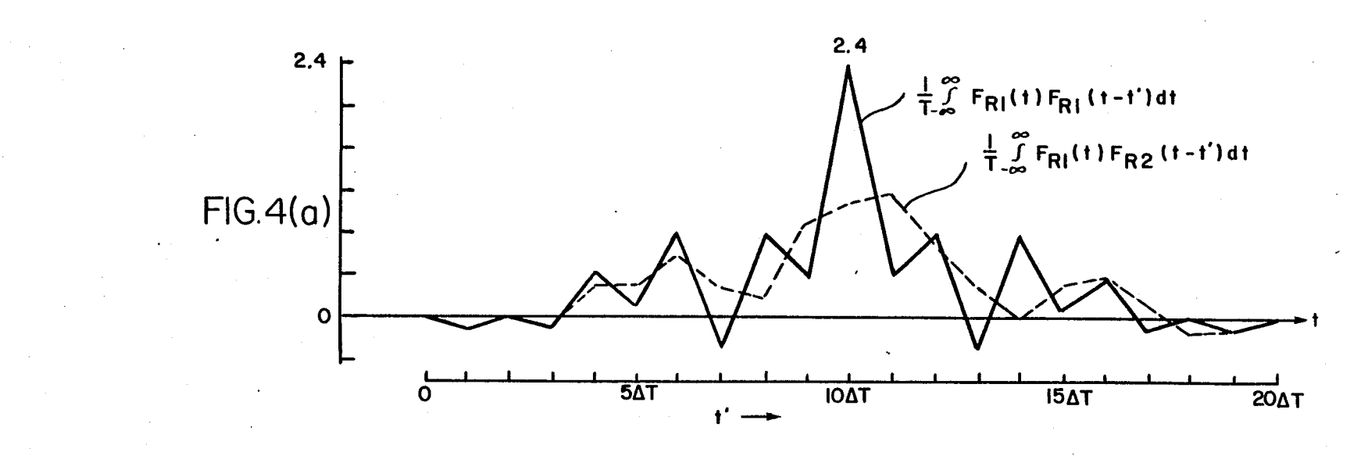
FIGS. 4a and b show certain auto- and cross-correlation functions of the $F_{R1}(t)$ and $F_{R2}(t)$ signals shown in FIGS. 2f and 3f.
Figure 4B:
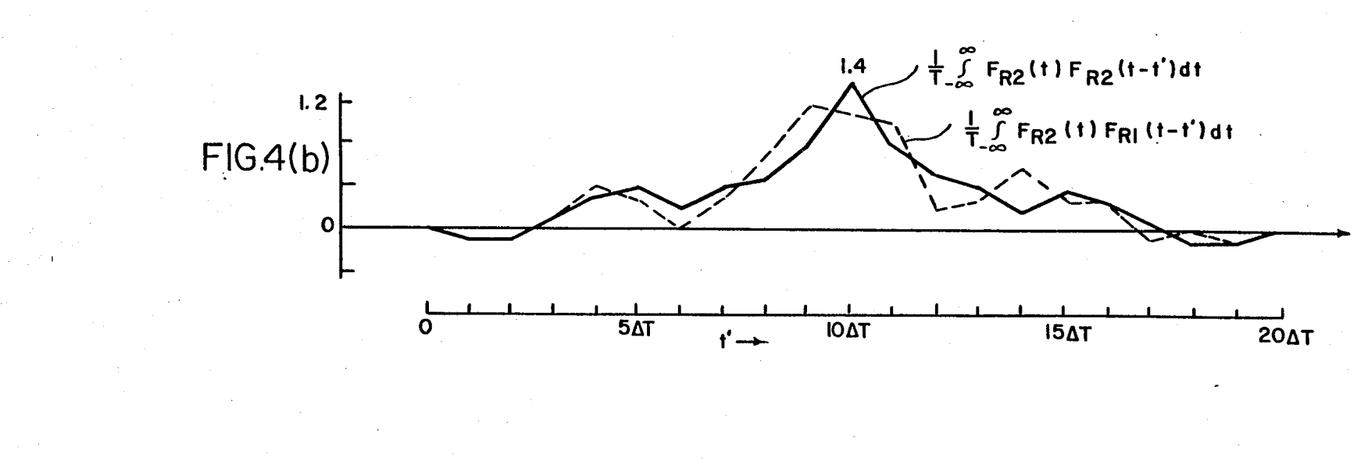

A comparison of FIGS. 4a and 5a shows little difference, even though FIG. 5a turns out to be better for a correct decision if one studies the matter for some time. However, the comparison of FIGS. 4b and 5b shows the substantial advantage gained by using the second integral in Eq. (4) and not relying on the correlation function alone.

Figure 6A:
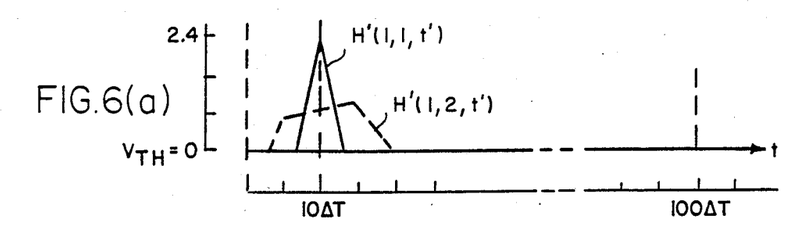
FIGS. 6a and 6b show the functions of FIGS. 5a and 5b where everything below a threshold $V_{TH}=0$ has been eliminated.
Figure 6B:
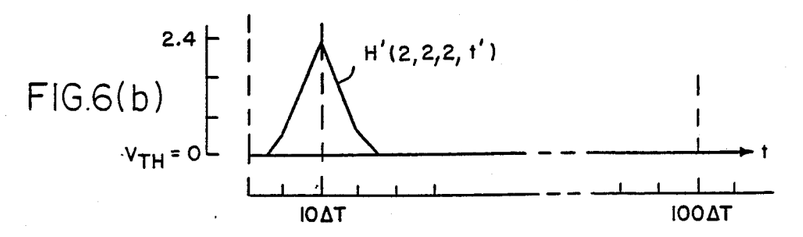

We introduce a threshold $V_{TH}=0$ and plot the functions of FIG. 5 only when they exceed this threshold. The resulting plots are shown in FIG. 6a and b. If the functions of FIG. 5 are represented by voltages one needs to feed them through a diode to a grounded resistor to obtain voltages according to FIG. 5a and b.

Figure 6C:
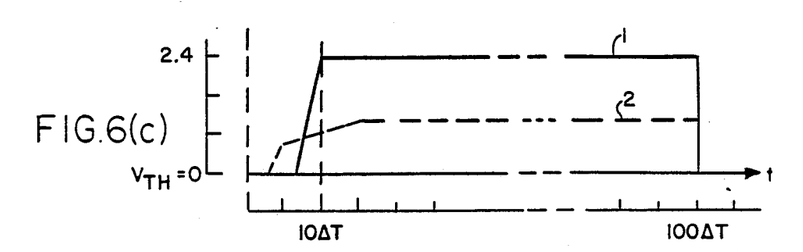
FIGS. 6c and 6d show the outputs of peak voltage followers whose inputs are the voltages according to FIGS. 6a and 6b.

Consider FIG. 6a. We want to determine whether $H'(1,1,t')$ or $H'(1,2,t')$ has the larger peak amplitude. We can see this right away. An electronic circuit can achieve the same result by feeding both functions (represented by voltages) to a peak voltage follower, which consists typicallly of a diode followed by a capacitor. The voltage across the capacitor equals the largest voltage applied to the diode during a certain previous time interval. The outputs of such peak voltage followers are shown in FIG. 6c. At the time $t=100\Delta T$, a voltage comparator decides which voltage is larger, and immediately afterwards the peak voltage follower is reset to $V_{TH}=0$. To explain the reason for a delay of $100\Delta T$ let $\Delta T$ in FIGS. 2 and 3 equal 1 ns, which corresponds to a distance or range resolution of 0.15 m. The time $100\Delta T$ then corresponds to a range cell of 15 m. This is about the length of a cruise missile. If one looks for a large airplane, one might want to increase the storage time in the peak voltage follower from $100\Delta T$ to $1000\Delta T$, corresponding to a range cell of 150 m.

The voltage comparator selects function 1 of FIG. 6c as having a larger amplitude then function 2. This implies that the signal $F_{R1}(t)$ of FIG. 2f rather than the signal $F_{R2}(t)$ of FIG. 3f was received, which in turn implies the target had the shape of FIG. 2a rather than that of FIG. 3a.

Figure 6D:
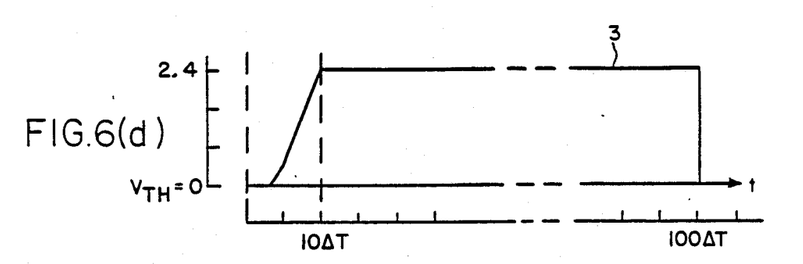

FIG. 6d shows the output of the peak voltage follower due to the function $H'(2,2,t')$. This function 3 is now the larger one since the function $H'(2,1,t')$ of FIG. 5b never exceeded the threshold $V_{TH}$. The voltage comparator thus selects $H'(2,2,t')$, which implies that the signal $F_{R2}(t)$ from the target of FIG. 2 was received. This completes the discussion of target recognition by means of the target's radar signature.

Figure 7:
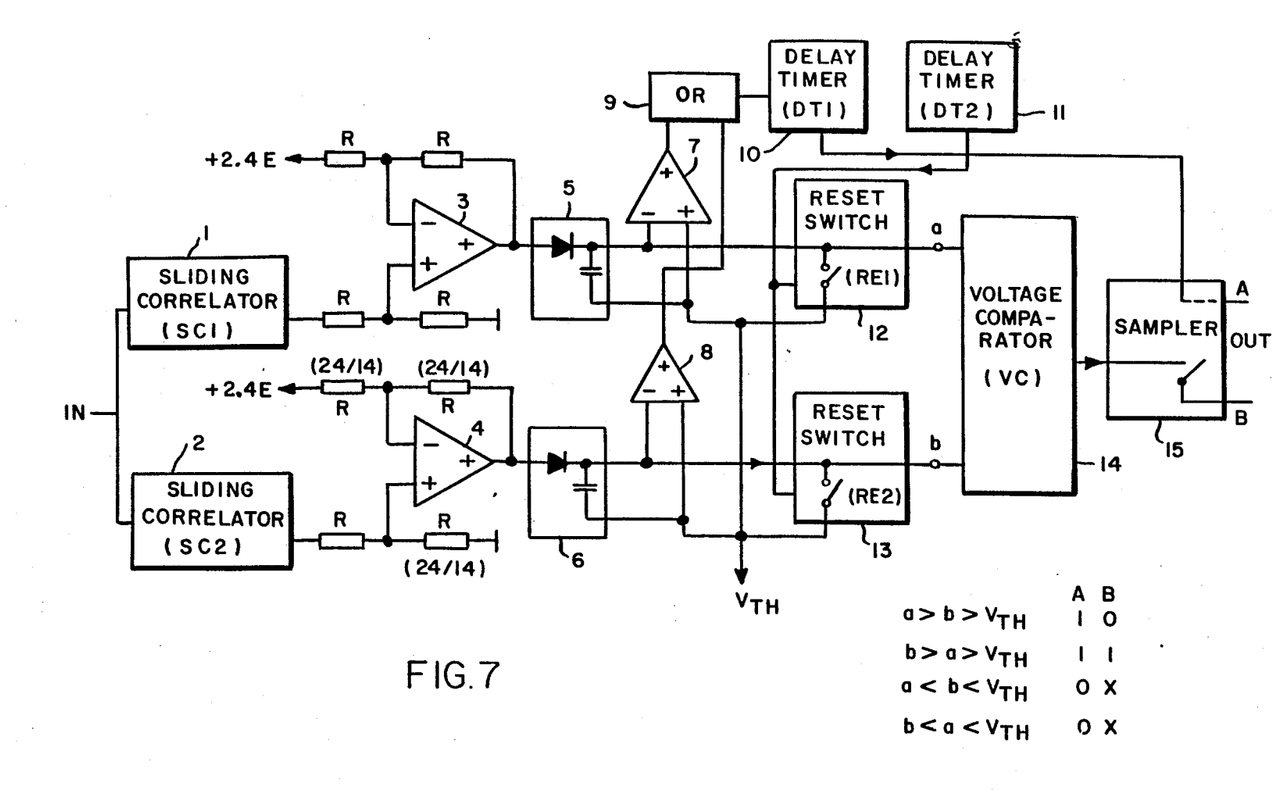
FIG. 7 is a block diagram pertaining to circuits that can discriminate between the patterns of the four scattering points shown in FIGS. 2 and 3.

For a discussion of circuits to implement the principles discussed consider FIG. 7. Either the signal $F_{R1}(t)$ of FIG. 2 or the signal $F_{R2}(t)$ of FIG. 3 are fed to the input terminal and reach the sliding correlators 1 and 2. Sliding correlator 1 is set for the signal $F_{R1}(t)$; sliding correlator 2 is set for the signal $F_{R2}(t)$. If $F_{R1}(t)$ is received we get the functions of FIG. 4a at the output terminals of the sliding correlators; if $F_{R2}(t)$ is received we get the functions of FIG. 4b. The resistors and operational amplifiers 3 and 4 at the output terminals of the sliding correlators add 24 or 14 and multiply by 14/14 or 24/14 to produce the voltages according to FIG. 5. The voltage +2.4E shown represents the term 24/10 of $H'(1,1,t')$ in FIG. 5a multiplied by a unit voltage E that depends on the voltage level at which the sliding correlators 1 and 2 operate.

The outputs of the operational amplifiers 3 and 4 are fed to the peak voltage followers 5 and 6 that produce the voltages of FIG. 6c or d. Note that the functions of FIG. 6a or b are never produced, they were only used to simplify the discussion.

The output voltage of the peak voltage followers 5 and 6 at rest equals the threshold voltage $V_{TH}$. If a received signal produces a larger voltage at either one or both of the peak voltage followers, it will be (almost infinitely) amplified by the amplifiers 7 and 8, and the delay timer 10 will be triggered via the OR-gate 9. Meanwhile the voltage comparator 14 will compare the voltages a and b and yield a binary output according to the truth table in the lower right corner of FIG. 7. At the time $100\Delta T$ the delay timer DT1 will sample the output terminal of the voltage comparator 14 and produce either the binary value 1 or 0 for B at one output terminal of the sampler 15. At the same time the delay timer 10 will also produce the binary value 1 for A, which indicates that B is to be used. Shortly after the delay, timer DT2 will reset the peak voltage followers 5 and 6 via the reset switches 12 and 13 to the threshold voltage $V_{TH}$.

This concludes the description of the principle of the circuit performing target recognition. There are many possible variations of this circuit, in particular it can be implemented strictly as a computer program. This is important since one would want hundreds or thousands of sliding correlators rather than the two shown in FIG. 7. As an example, consider the implementation of the peak voltage followers by a computer program written in BASIC:

10 U=V
11 REM V=threshold
20 DATA
21 REM Enter N numbers representing amplitude samples of one of the functions of FIG. 5.
30 FOR K=1 TO N
40 READ U(K)
50 IF U(K) U THEN 70
60 U=U(K)
70 NEXT K
71 REM Use U as input for the program for the voltage comparator.

Examples of voltage comparators are discussed in the literature, e.g., in Section 6.2.2 of the book "Transmission of Information by Orthogonal Functions", 2nd edition, by H. F. Harmuth, Springer-Verlag, 1972. A computer program for a voltage comparator is almost the same as for a peak voltage follower, except that one must keep track of the variable K that yields the largest voltage U(K).

Since the method of target shape or pattern recognition is primarily useful for the extraction of targets from clutter, we want to show that it can be used in conjunction with a doppler processor or moving target processor which use relative velocity to extract targets from clutter.

Figure 8:
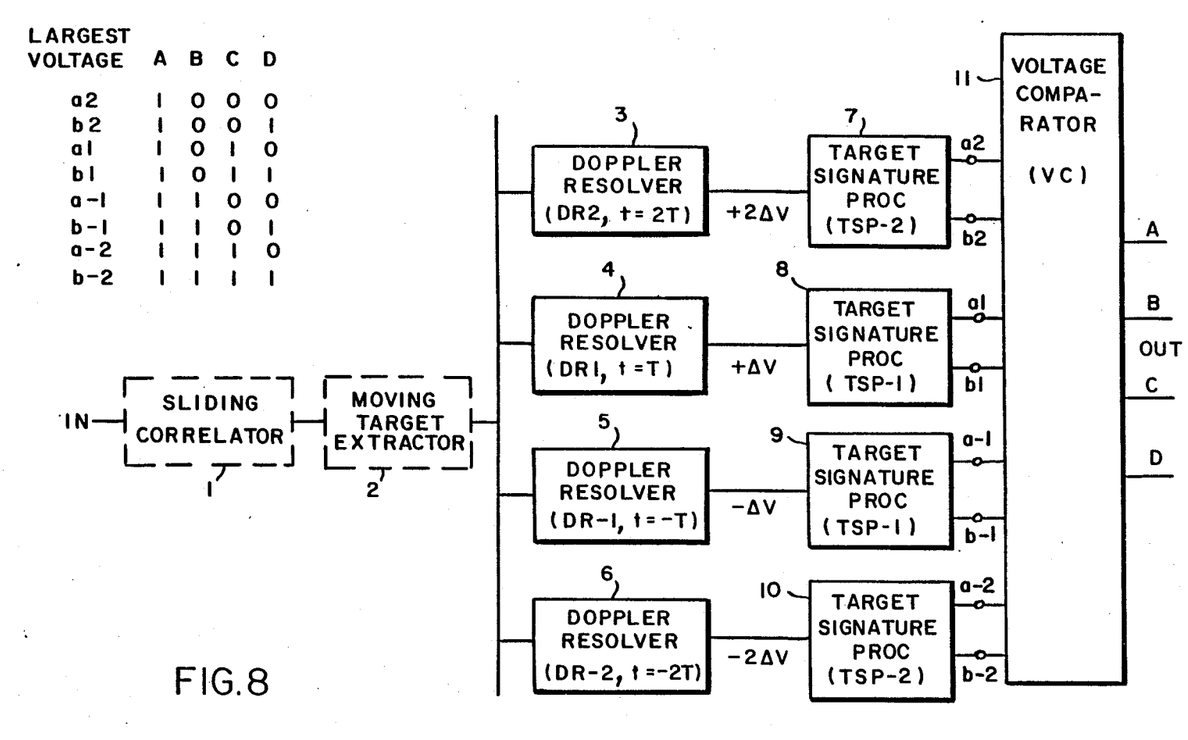
FIG. 8 is a block diagram that is used to explain how a circuit according to FIG. 7 can be used in combination with a velocity (doppler) processor.

FIG. 8 shows the principle of a circuit combining doppler processing and target pattern processing. The received signal passes the sliding correlator 1 and the moving target extractor 2; these two circuits are not needed for our present discussion but they are important in practical equipment to reduce the dynamic range required for the following circuits. The pre-processed signal passes through a doppler processor 3–6; in our example it separates signals from targets with velocities $+2\Delta v$, $+\Delta v$, $-\Delta v$, $-2\Delta v$. The negative velocities represent approaching targets; the positive velocities represent targets that are receding. The velocity 0 is not wanted since it represents clutter. A detailed discussion of this doppler resolver for carrier-free radar signals is given in Section 6.1.6, particularly FIG. 6.1-12, of the book "Nonsinusoidal Waves for Radar and Radio Communication" by H. F. Harmuth, Academic Press 1981.

Target signature processors 7–10 according to FIG. 7 are connected to the output terminal of each doppler resolver 3–6 and their output terminals in turn are connected to a voltage comparator. The reason why the voltage comparator is connected to all target signature processors of all doppler resolvers is that only one target is expected per range cell. If targets with different velocities are expected in one range cell one must not compare voltages originating from different doppler processors.

FIG. 8 clearly shows that the implementation of a circuit in analog techniques would be immensely expensive. If we use 10 doppler resolvers from $+5\Delta v$ to −5Δv and 100 target signature processors each, we would need 1000 sliding correlators, 1000 peak voltage followers, etc. A more prudent approach is to observe the outputs of all doppler processors, and switch one target signature processor to a doppler processor which produces a large output voltage. Time is not of great concern. Even if the time unit ΔT in FIGS. 2 and 3 is 1 ns, the doppler resolvers will average over many milliseconds, and the target signature processor may well compute for as long as a second before making a decision. This suggests to implement circuits according to FIG. 7 by a specialized programmable computer that is connected via a multiplexer to many doppler resolvers.

Figure 9A:
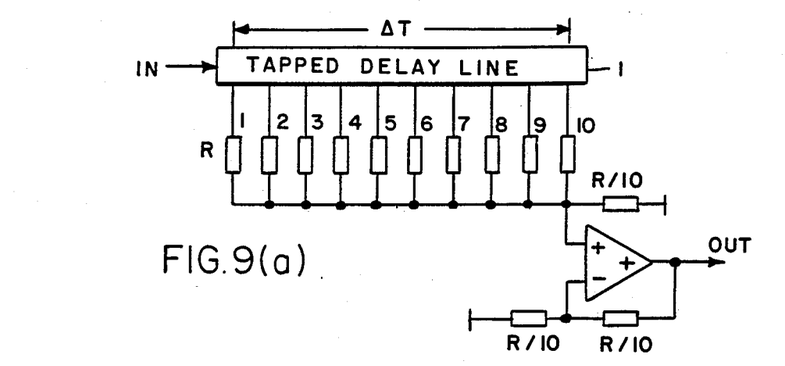
FIG. 9a shows a sliding correlator for a single pulse.
Figure 9B:
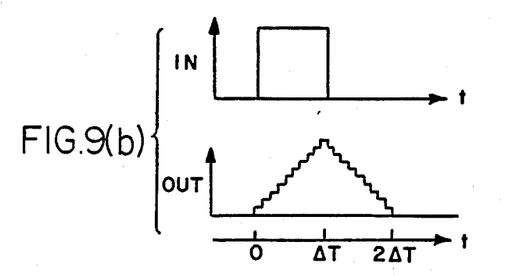
FIG. 9b shows a rectangular input pulse for this circuit and the resulting triangular staircase output pulse.
Figure 9C:
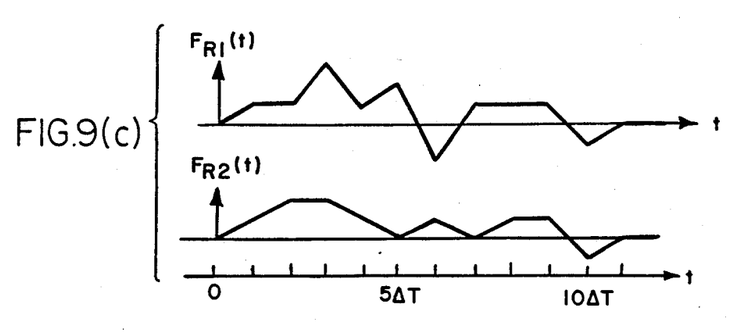

The sliding correlator 1 and the moving target extractor 2 in FIG. 8 merit some additional comments. We have until now assumed that signals $F_{R1}(t)$ and $F_{R2}(t)$ according to FIGS. 2f and 3f are to be compared. Consider now a sliding correlator for one rectangular pulse of duration ΔT as shown in FIG. 9a. A tapped delay line 1 with 10 taps and the delay ΔT/10 between adjacent taps feeds the incoming signal via ten resistors with resistance R to a summing amplifier. The rectangular pulse of FIG. 9b at the input terminal of the circuit will produce the triangular staircase function of FIG. 9b at the output terminal. Consider now the two functions $F_{R1}(t)$ and $F_{R2}(t)$ of FIGS. 2f and 3f fed to this circuit. The output functions obtained are shown in FIG. 9c. The principle of our processing applies to the discrimination of these two functions as much as to the discrimination between $F_{R1}(t)$ and $F_{R2}(t)$ in FIGS. 2f and 3f.

Figure 1C:
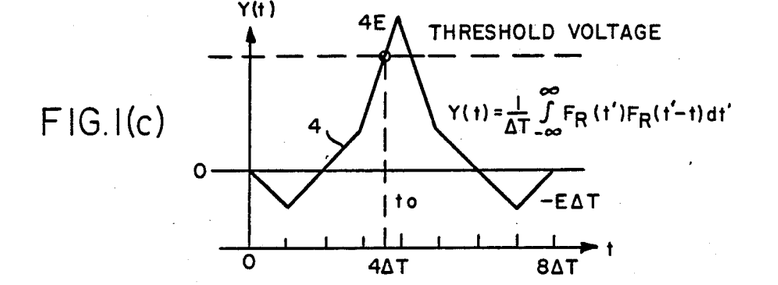
FIG. 1c shows the auto-correlation function of the returned signal.
Figure 10A:
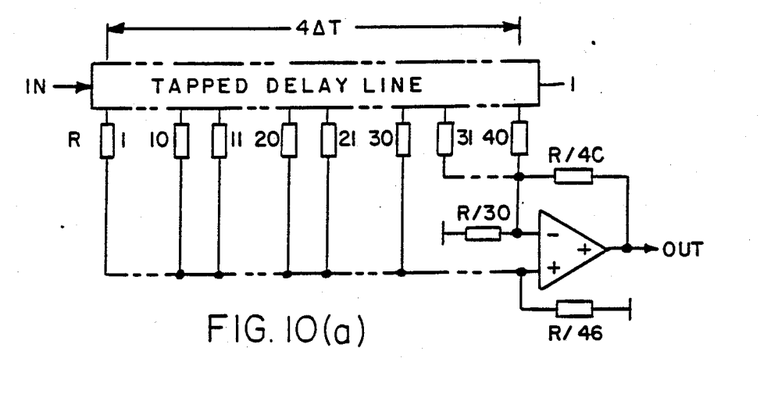
FIG. 10a shows a sliding correlator for $F_R(t)$ of FIG. 1b used as a sample function.
Figure 10B:
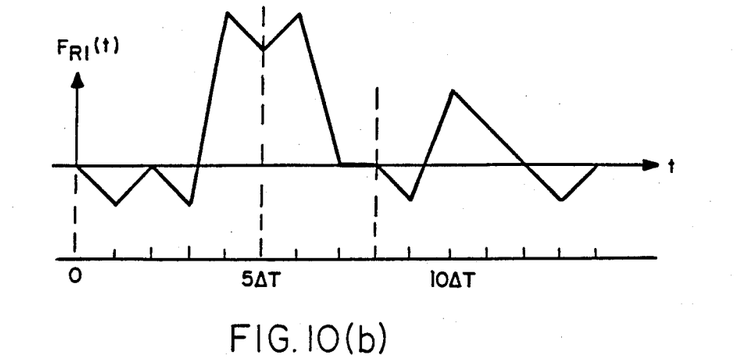
FIG. 10b shows the cross-correlation function of $F_{R1}(t)$ of FIG. 2f with $F_R(t)$.
Figure 10C:
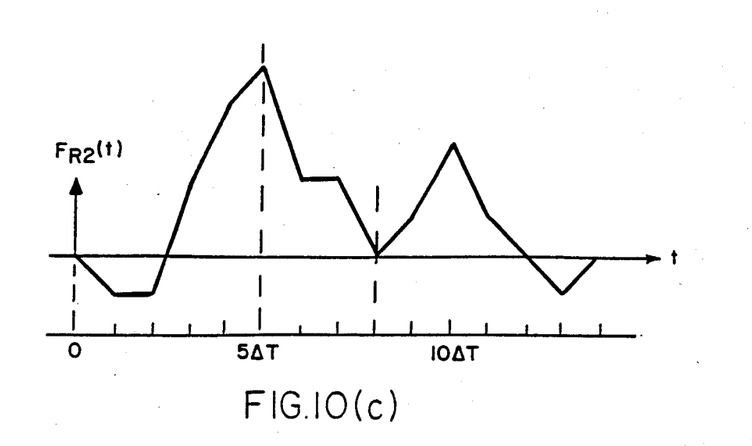
FIG. 10c shows the cross-correlation function of $F_{R2}(t)$ of FIG. 3f with $F_R(t)$.

Let us go one step further and consider a sliding correlator for the signal of FIG. 1b. It is shown in FIG. 10a. A tapped delay line 1 with 40 taps with delay ΔT/10 between adjacent taps is connected to 40 equal resistors with resistance R; 30 of them are connected to the noninverting input terminal (+) of the operational amplifier and 10 to the inverting input terminal (−). If the signals $F_{R1}(t)$ and $F_{R2}(t)$ of FIGS. 2f and 3f are fed to this sliding correlator one obtains at the output the functions of FIG. 10b. Again we can distinguish between these two functions. Disposing the correlator 1 at the input in FIG. 8 (not necessarily in front of the moving target extractor 2) is important to reduce the noise and thus the dynamic range required for the circuits following this sliding correlator. In particular, it makes it possible to use analog-to-digital conversion after the sliding correlator and thus to implement all the circuits by a special purpose digital computer.

The moving target extractor 2 in FIG. 8 is intended to eliminate a good part of the clutter and thus reduce the dynamic range required for the circuits following it. It will modify the signal received from a target, but just as in the case of the sliding correlator this will only call for different sample functions with which the received functions are compared.

I claim:

1. A method of determining the shape or pattern of a radar target from the characteristic distortion imparted in the time domain to the radar signal returned by the target from an incident, transmitted carrier-free radar signal, where the range resolution of the incident radar signal is significantly smaller than the dimensions of the target, comprising the steps of:
    (1) storing in a library a plurality of sample functions pertaining to various shapes and patterns representing radar signals returned by reflection of the incident carrier-free radar signal from targets of correspondingly varied shapes and patterns;
    (2) comparing the returned signal with a set of the sample functions selected from the library; and
    (3) determining the sample function best matching the returned signal in the time domain by the criterion of least-mean-square deviation.

2. A method of identifying a radar target shape or pattern from the characteristic distortion imparted in the time domain to the radar signal returned by the target from an incident, transmitted carrier-free radar signal, where the range resolution of the incident radar signal is significantly smaller than the dimensions of the target, comprising the steps of:
    (1) passing the returned signal through a sliding correlator;
    (2) storing in a library a plurality of sample functions pertaining to various shapes and patterns representing a radar signals returned by reflection of the incident carrier-free radar signal from targets of correspondingly varied shapes and patterns, and passed through a sliding correlator;
    (3) comparing the output signal from the sliding correlator with a set of the sample functions selected from the library; and
    (4) determining the sample function best matching the correlator output signal in the time domain.

3. A method of identifying a radar target shape or pattern from the characteristic distortion imparted in the time domain to the radar signal returned by the target from an incident, transmitted carrier-free radar signal, where the range resolution of the incident radar signal is significantly smaller than the dimensions of the target, comprising the steps of:
    (1) passing the returned signal through a moving target extractor;
    (2) storing in a library a plurality of sample functions pertaining various shapes and patterns representing radar signals returned by reflection of the incident carrier-free radar signal from targets of correspondingly varied shapes and patterns, and passed through a moving target extractor;
    (3) comparing the output signal from the moving target extractor with a set of the sample functions selected from the library; and
    (4) determining the sample function best matching the extractor output signal in the time domain.

4. A method of identifying a radar target shape or pattern from the characteristic distortion imparted in the time domain to the radar signal returned by the target from an incident, transmitted carrier-free radar signal, where the range resolution of the incident radar signal is significantly smaller than the dimensions of the target, comprising the steps of:
    (1) passing the returned signal through a sliding correlator and a moving target extractor to produce a processed returned signal;
    (2) storing in a library a plurality of sample functions pertaining to various shapes and patterns representing radar signals returned by reflection of the incident carrier-free radar signal from targets of correspondingly varied shapes and patterns, and passed through a sliding correlator and moving target indicator;
    (3) comparing the processed returned signal with a set of the sample functions selected from the library; and
    (4) determining the sample function best matching the processed returned signal in the time domain.

* * * * *